United States Patent
Zhang et al.

(10) Patent No.: US 10,798,599 B2
(45) Date of Patent: Oct. 6, 2020

(54) SYSTEM AND METHOD FOR CONTROLLING USER EQUIPMENT OFFLOADING

(71) Applicant: Futurewei Technologies, Inc., Plano, TX (US)

(72) Inventors: Peng Zhang, Shanghai (CN); Carmela Cozzo, San Diego, CA (US); Xiaolei Tie, Shanghai (CN); Min Xu, Shanghai (CN)

(73) Assignee: Futurewei Technologies, Inc., Plano, TX (US)

(*) Notice: Subject to any disclaimer, the term of this patent is extended or adjusted under 35 U.S.C. 154(b) by 124 days.

(21) Appl. No.: 15/224,246

(22) Filed: Jul. 29, 2016

(65) Prior Publication Data

US 2017/0034738 A1 Feb. 2, 2017

Related U.S. Application Data

(60) Provisional application No. 62/199,037, filed on Jul. 30, 2015.

(51) Int. Cl.
*H04W 36/22* (2009.01)
*H04W 24/10* (2009.01)

(52) U.S. Cl.
CPC ........ *H04W 24/10* (2013.01); *H04W 36/22* (2013.01)

(58) Field of Classification Search
CPC ..... H04W 24/10; H04W 36/22; H04W 12/06; H04W 28/08; H04W 36/0005; H04W 36/0088; H04W 76/04; H04W 48/12; H04W 48/18; H04W 48/20; H04W 72/02; H04W 72/04; H04W 72/06; H04W 72/1252; H04W 84/042; H04W 68/12; H04W 88/06; H04W 88/08; H04W 88/10; H04W 92/04; H04W 92/06
See application file for complete search history.

(56) References Cited

U.S. PATENT DOCUMENTS

| | | | |
|---|---|---|---|
| 6,321,083 B1* | 11/2001 | Vaara | H04W 24/00 455/432.1 |
| 2004/0022213 A1* | 2/2004 | Choi | H04W 24/10 370/332 |
| 2009/0036116 A1* | 2/2009 | Kim | H04W 24/10 455/423 |
| 2012/0208544 A1* | 8/2012 | Aoyagi | H04W 48/02 455/448 |
| 2012/0329448 A1* | 12/2012 | Lim | H04W 92/20 455/422.1 |

(Continued)

OTHER PUBLICATIONS

"Universal Mobile Telecommunications System (UMTS); UTRAN Iur interface Radio Network Subsystem Application Part (RNSAP) signalling (3GPP TS 25.423, V13.3.0, Release 13)", Aug. 2016, 1,295 pages.

(Continued)

*Primary Examiner* — Mohamed A Kamara
(74) *Attorney, Agent, or Firm* — Slater Matsil, LLP

(57) ABSTRACT

An embodiment method for controlling user equipment (UE) offloading includes transmitting, by a node B, to a radio network controller (RNC), a report including at least one downlink quantity associated with a UE and received by the node B from the UE.

23 Claims, 2 Drawing Sheets

(56) References Cited

U.S. PATENT DOCUMENTS

| | | | |
|---|---|---|---|
| 2013/0190030 A1* | 7/2013 | Holma | H04W 28/08 |
| | | | 455/509 |
| 2013/0316709 A1* | 11/2013 | Watanabe | H04W 60/00 |
| | | | 455/435.2 |
| 2014/0204771 A1* | 7/2014 | Gao | H04W 36/22 |
| | | | 370/252 |
| 2015/0271728 A1 | 9/2015 | Tie et al. | |
| 2016/0165471 A1* | 6/2016 | Bontu | H04L 1/0026 |
| | | | 370/241 |
| 2016/0212649 A1* | 7/2016 | Chen | H04L 5/0055 |

OTHER PUBLICATIONS

"3rd Generation Partnership Project; Technical Specification Group Access Network; UTRAN Iub interface Node B Application Part (NBAP) signalling (Release 13)", 3GPP TS 25.433, V13.3.0, Jun. 2016, 1,371 pages.

"3rd Generation Partnership Project;Technical Specification Group Radio Access Network; Physical layer procedures (FDD) (Release 12)," 3GPP TS 25.214 V12.3.0 (Jun. 2015), 137 pages.

3rd Generation Partnership Project; Technical Specification Group Radio Access Network; Universal Terrestrial Radio Access Network (UTRAN); General description; Stage 2 (Release 12), 3GPP TS 25.300 V12.4.0 (Jun. 2015), 13 pages.

* cited by examiner

SYSTEM AND METHOD FOR CONTROLLING USER EQUIPMENT OFFLOADING

CROSS-REFERENCE TO RELATED APPLICATIONS

This application claims the benefit of U.S. Provisional Application No. 62/199,037, filed on Jul. 30, 2015, which application is hereby incorporated herein by reference.

TECHNICAL FIELD

The present invention relates to a system and method for wireless communications, and, in particular embodiments, to a system and method for controlling user equipment offloading.

BACKGROUND

The performance of a network may benefit from a balanced load distribution, wherein traffic is offloaded from a more loaded cell to a less loaded cell in order to improve resource utilization. One typical scenario involves a heterogeneous network that has a load imbalance between a higher power node and a lower power node. In such a case, traffic may be offloaded from the higher power node to the lower power node. Homogeneous network deployment is another scenario where there may be a cell that is lightly loaded but potentially capable of handling more traffic. The offloading may be accomplished by configuring the lightly loaded cell with a larger cell individual offset.

A cell may include a component configured to provide wireless access to a network, such as an enhanced node B (eNB), a Wi-Fi access point or some other wirelessly enabled device. Any such component will be referred to herein as a node B. A node B may provide wireless access in accordance with one or more wireless communication protocols, such as Long Term Evolution (LTE), LTE Advanced (LTE-A), High Speed Packet Access (HSPA), or Wi-Fi 802.11a/b/g/n/ac. A node B may be capable of establishing a wireless connection with a user equipment (UE), a mobile station, or some other wirelessly enabled device. Any such component will be referred to herein as a UE.

SUMMARY

An embodiment method for user equipment (UE) offloading includes transmitting, by a node B, to a radio network controller (RNC), a report including at least one downlink quantity associated with a UE and received by the node B from the UE.

An embodiment node B includes a non-transitory memory storage comprising instructions and one or more processors in communication with the memory. The one or more processors execute the instructions for transmitting, to an RNC, a report including at least one downlink quantity associated with a UE and received by the node B from the UE.

An embodiment method for UE offloading includes an RNC configuring a node B to transmit to the RNC a report including at least one downlink quantity associated with a UE and received by the node B from the UE.

An embodiment RNC includes a non-transitory memory storage comprising instructions and one or more processors in communication with the memory. The one or more processors execute the instructions for the RNC to configure a node B to transmit to the RNC a report including at least one downlink quantity associated with a UE and received by the node B from the UE.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
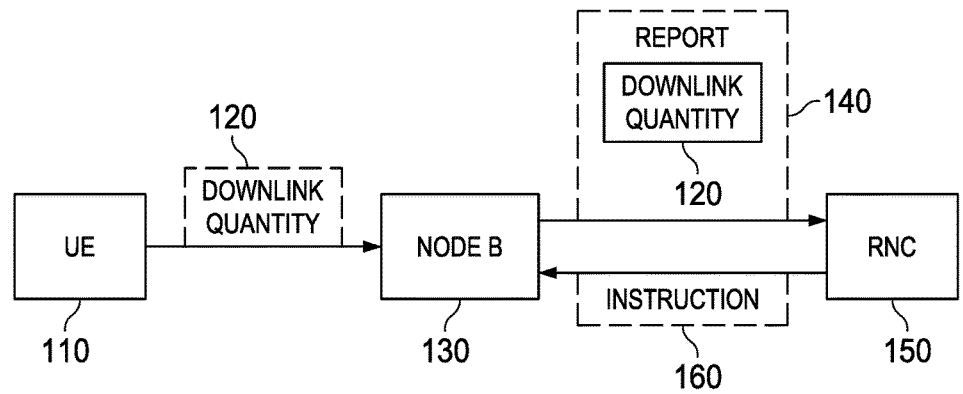
FIG. 1 illustrates an embodiment system and method for controlling user equipment offloading.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A UE typically makes various measurements related to the quality of the downlink between the UE and the serving node B with which the UE is in communication and/or between the UE and a candidate node B to which the UE might be handed over. A result of such a measurement may be referred to herein as a downlink quantity. Examples of downlink quantities include a downlink transport block size (TBS) and a channel quality indicator (CQI). After obtaining one or more downlink quantities, the UE reports the downlink quantities to the serving node B.

In an embodiment, a node B reports to a radio network controller (RNC) or a similar component a downlink quantity, such as a downlink TBS or a CQI, associated with a UE and received by the node B from the UE. The report indicates to the RNC the identity of the UE and/or the identity of a downlink radio link between the UE and the node B so that the RNC knows the UE with which the downlink quantity is associated. The report may further indicate to the RNC whether the downlink quantity is a serving downlink quantity (i.e., a downlink quantity between a serving cell and a UE) or a candidate downlink quantity (i.e., a downlink quantity between a candidate cell and a UE).

In an embodiment, an RNC configures a node B to send a report of one or more downlink quantities to the RNC and may configure the node B to report the downlink quantities either on demand or periodically. In the "on demand" case, the RNC sends a request or other instruction to the node B indicating that the node B is to report to the RNC, at substantially the time of receiving the request, all downlink quantities associated with the UE or an indicated downlink quantity associated with the UE. Such a request may also indicate that identity information associated with the UE is to be reported to the RNC. The identity information may be the identity of the UE and/or the identity of a radio link associated with the UE. Responsive to receiving an "on demand" request from an RNC, a node B reports to the RNC all downlink quantities associated with the UE or an indicated downlink quantity associated with the UE. The report of the downlink quantity may include a downlink channel quantity between the UE and the serving cell and a downlink channel quantity between the UE and a candidate cell. The RNC may send the "on demand" request based on the load of the serving cell and/or the load of the candidate cell.

Alternatively, the RNC may instruct the node B to report one or more downlink quantities periodically and may inform the node B of the period at which the node B is to report the downlink quantities. As with the "on demand" request, an instruction to report periodically may include identity information for the UE and an indication that the node B is to report to the RNC all downlink quantities associated with the UE or an indicated downlink quantity associated with the UE. Responsive to receiving an instruction from an RNC to report periodically, a node B periodically reports to the RNC all downlink quantities associated with the UE or an indicated downlink quantity associated with the UE in accordance with the period information received from the RNC.

In the "on demand" and periodic reporting scenarios, the node B reports downlink quantities to the RNC in accordance with instructions from the RNC specifying when the downlink quantities are to be reported. In another embodiment, the node B is configured to report one or more downlink quantities to the RNC without any instructions from the RNC. In particular, the node B is configured to report the most recently available downlink quantities to the RNC at some point during the setup of a link between the node B and the RNC.

In an alternative embodiment, an RNC configures a node B to report a downlink quantity when the value of the downlink quantity changes. In this case, the node B reports a downlink quantity to the RNC as described above only when there is a difference between the current value of a downlink quantity and a past value of that downlink quantity. The RNC may configure the node B to report a downlink quantity for all UEs associated with the node B or only for an indicated UE. The size of the difference between the current value of a downlink quantity and a past value of the downlink quantity that triggers reporting of the downlink quantity may be predetermined by the RNC, and the RNC may inform the node B of this difference. The node B reports the downlink quantity to the RNC when this difference is larger than a predetermined threshold.

In an alternative embodiment, an RNC sends a node B a reporting threshold for a downlink quantity, and the node B compares the current value of the downlink quantity with the threshold. If a predetermined condition is met after the comparison, the node B reports the downlink quantity to the RNC. In addition to sending the threshold, the RNC may also request identity information for the UE associated with the downlink quantity, as described above. This procedure may be applied to all UEs associated with the node B or may be applied only to one or more indicated UEs. A first example of a predetermined condition is that a downlink quantity between at least one candidate cell and a UE is reported only when the downlink quantity is larger than a threshold. A second example of a predetermined condition is that a downlink quantity is reported only when the difference between the value of that downlink quantity for a UE's serving node B and the value of that downlink quantity for at least one of the UE's candidate node Bs is smaller than a threshold.

The RNC may notify the node B to report downlink quantities for all UEs associated with the serving node B and/or for all UEs associated with one or more candidate node Bs. Alternatively, the RNC may notify the node B to report downlink quantities only for indicated UEs associated with the serving node B and/or only for UEs associated with one or more candidate node Bs. Methods to indicate a specific UE for which serving downlink quantities and/or candidate downlink quantities are to be reported include indicating the radio link identity associated with that UE and its serving cell and/or candidate cell or indicating the identity of the UE.

Table 1 illustrates modifications that may be made to Third Generation Partnership Project (3GPP) Technical Specification (TS) 25.423 and 3GPP TS 25.433, which are hereby incorporated herein by reference, to implement the embodiments disclosed herein. The last row in Table 1 has been added to the existing 3GPP technical specifications to create a new dedicated measurement type, "DL transport block size." The possible report characteristics for this new dedicated measurement type are "On Demand" and "Periodic."

TABLE 1

Allowed Dedicated Measurement Type and Report Characteristics Type Combinations

| Dedicated Measurement Type | Report Characteristics Type | | | | | | | | |
|---|---|---|---|---|---|---|---|---|---|
| | On Demand | Periodic | Event A | Event B | Event C | Event D | Event E | Event F | On Modification |
| SIR | X | X | X | X | X | X | X | X | |
| SIR Error | X | X | X | X | X | X | X | X | |
| Transmitted Code Power | X | X | X | X | X | X | X | X | |
| RSCP | X | X | X | X | X | X | X | X | |
| Rx Timing Deviation | X | X | X | X | | | X | X | |
| Round Trip Time | X | X | X | X | X | X | X | X | |
| Rx Timing Deviation LCR | X | X | X | X | | | X | X | |
| HS-SICH Reception Quality | X | X | X | X | | | X | X | |
| Angle Of Arrival LCR | X | X | | | | | | | |

TABLE 1-continued

Allowed Dedicated Measurement Type and Report Characteristics Type Combinations

| Dedicated Measurement Type | Report Characteristics Type | | | | | | | | |
|---|---|---|---|---|---|---|---|---|---|
| | On Demand | Periodic | Event A | Event B | Event C | Event D | Event E | Event F | On Modification |
| Rx Timing Deviation 7.68 Mcps | X | X | X | X | | | X | X | |
| Rx Timing Deviation 3.84 Mcps | X | X | X | X | | | X | X | |
| Extended UE transmission power headroom | X | X | | X | | | | X | |
| DL transport block size | X | X | | | | | | | |

FIG. 1 illustrates an embodiment system and method for controlling UE offloading. A UE 110 determines a downlink quantity 120, such as a downlink TBS or a CQI, associated with itself and a node B 130 and sends the downlink quantity 120 to the node B 130. The node B 130 has been configured by an RNC 150 to send the RNC 150 a report 140 that includes the downlink quantity 120. The node B 130 sends the report 140 to the RNC 150 either on demand or periodically in accordance with an instruction 160 received from the RNC 150. The report 140 may further include the identity of the UE 110 and/or the identity of the radio link between the UE 110 and the node B 130.

A benefit of the above embodiments is that the RNC receives information not currently available to the RNC about a downlink quantity between a UE and a node B. The RNC is able to use this downlink quantity information to make better decisions regarding how to offload UEs. A further benefit of the above embodiments is that the node B does not need to continuously report the downlink quantity to the RNC.

Cell range expansion is a technique that may be used in heterogeneous networks to cause UEs to connect to low power nodes. In cell range expansion, a UE operating in a macro cell may be encouraged to be handed over to a low power node by setting a bias, known as a cell individual offset (CIO), for the low power node. In this technique, the received signal strength measured by a UE in a low power node is increased by the CIO to make the received signal strength appear greater than it actually is. Such a technique broadens the region of coverage supported by a low power node without actually increasing the transmit power of the low power node. The CIO is based on measurements of the received pilot power and does not reflect the UE's receiver capabilities.

Enhanced receiver capabilities are usually used to process data in an interference condition. After a UE is offloaded to another cell as a consequence of a larger CIO towards the new serving cell, the UE may experience less favorable link performance. If the UE has an advanced receiver, e.g., a receiver with interference cancellation/suppression (ICS) capability, the link performance may be still acceptable after offloading. If, instead, the UE is not ICS-capable, the link performance after offloading may degrade substantially, and offloading to the other cell should be avoided. As a result, a CIO based only on pilot power measurements may not be optimal when applied to UEs with different receiver capabilities. The existing offloading mechanism based on CIO does not take into account the ICS capability of the UEs and therefore may not offload UEs with enhanced receiver capabilities when the overall system performance may be enhanced by offloading such UEs.

An embodiment provides enhanced offloading techniques that benefit UEs with ICS capability.

The network may indicate a candidate cell or a set of candidate cells to which a UE may be offloaded. The UE may make measurements of the downlink channel quality between the indicated candidate cell and the UE or between each cell in the indicated set of candidate cells and the UE. One such measurement quantity related to a candidate cell may be referred to as $CQI_{candidate}$. The measurements of the downlink channel quality between the serving cell and the UE may be referred to as $CQI_{serving}$. The UE sends $CQI_{candidate}$ (or $CQI_{candidate}$ and $CQI_{serving}$) to the network, and the network determines whether to offload the UE from the serving cell to the candidate cell based on the $CQI_{candidate}$ (or $CQI_{candidate}$ and $CQI_{serving}$) reported by the UE.

In an example of an enhanced offloading mechanism, an RNC is aware of the capabilities of a node B, including a capability to receive $CQI_{candidate}$ (and/or $CQI_{serving}$) from a UE and a capability to report a quantity derived from $CQI_{candidate}$ to the RNC via Iub signaling between the RNC and the node B. The quantity derived from $CQI_{candidate}$ may be referred to as $Q_{candidate}$ and may be the $CQI_{candidate}$ itself, a filtered $CQI_{candidate}$, and/or a function of $CQI_{candidate}$. $Q_{serving}$ derived from $CQI_{serving}$ may also be reported. All behaviors for $Q_{candidate}$ may also be applied to $Q_{serving}$. This example also applies when multiflow is activated. The multiflow feature allows simultaneous transmission of independent downlink data streams from the serving and assisting node Bs, and transmission of the CQIs corresponding to the downlink transmission of the serving and assisting node Bs from the UE to the node Bs.

Figure 2:
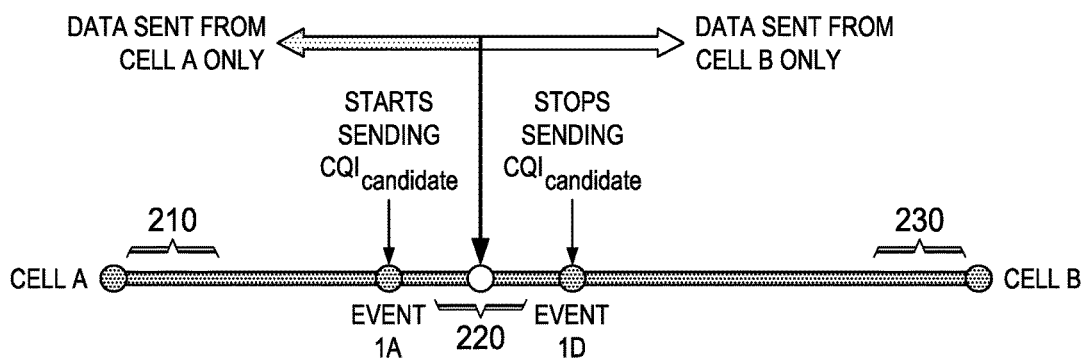
FIG. 2 illustrates $CQI_{candidate}$ configurations at different locations.

FIG. 2 shows $CQI_{candidate}$ configurations at different locations. In this example, it is assumed that the node Bs of Cell A and Cell B have the above described capabilities. Cell A is heavily loaded while Cell B is lightly loaded. The serving cell is Cell A, and Cell A sends data to the UE.

At or near the leftmost point 210, the UE has identified Cell B by measuring the pilot signal strength of the pilot signal sent by Cell B. The UE sends a report, e.g., at Event 1A, to the RNC indicating that the UE has identified Cell B. The RNC then configures the UE to derive $CQI_{candidate}$ for Cell B, via radio resource control (RRC) signaling or physical (PHY) signaling, e.g., high-speed shared control channel (HS-SCCH) order. The derivation of $CQI_{candidate}$ at the UE may be a legacy CQI measurement of the downlink channel quality between Cell B and the UE over a short period of time, or may be a long term CQI measurement of the downlink channel quality over a long period of time. The UE sends $CQI_{candidate}$ (and/or $CQI_{serving}$) to Cell A, and the node B of Cell A reports $Q_{candidate}$ (and/or $Q_{serving}$) to the RNC.

At or near the middle point 220, the RNC determines to send data to the UE from Cell B instead of Cell A according to the $Q_{candidate}$ (and/or $Q_{serving}$) value and optionally the load status of each cell. For example, this determination by the RNC may occur if $Q_{candidate}$ is higher than a predefined threshold or the difference of $Q_{candidate}$ and $Q_{serving}$ is within a certain value range which is predefined or dynamically maintained according to the load statuses of the serving and candidate cells. The RNC then, via Iub signaling, configures Cell B to send data to the UE and configures the UE to receive data from Cell B via RRC signaling or PHY signaling (e.g., HS-SCCH order). After the configuration, the serving cell of the UE is changed to Cell B. $CQI_{candidate}$ may then be derived from the downlink channel quality between Cell A and the UE, and $CQI_{serving}$ may be the downlink channel quality between Cell B and UE. The UE sends $CQI_{candidate}$ (and/or $CQI_{serving}$) to Cell B, and the node B of Cell B reports $Q_{candidate}$ (and/or $Q_{serving}$) to the RNC.

At or near the rightmost point 230, the UE sends another report to the RNC indicating the Cell A and/or Cell B pilot signal strength. The RNC then configures the UE not to send and/or derive $CQI_{canthdate}$.

The location of the middle point 220 may depend on the UE's capabilities and performance. Because the RNC is aware of the UE CQI at Cell B when the UE is still served by the Cell A, the RNC may offload data to the UE from Cell B only when the UE is expected to have sufficient link level quality at Cell B. If the UE receiver has advanced receiver capabilities, the middle point 220 may be closer to Cell A, because such a UE can handle the interference from Cell A with sufficient link performance after offloading to Cell B. If the UE receiver does not have advanced receiver capabilities, the middle point 220 may be closer to Cell B because, at a point closer to Cell A, such a UE may not be able to handle the interference from Cell A after offloading to Cell B while maintaining sufficient performance. The enhanced offloading is able to take into account different UE receiver capabilities and link performance when offloading is performed. This is beneficial to the UE performance after offloading, as well as to the load balancing performance of the system.

In the above embodiments, the high speed dedicated physical control channel (HS-DPCCH) transmit power configuration/slot format may be considered when the enhanced offloading mechanism is enabled. Also, the HS-SCCH reception configuration may be considered when the enhanced offloading mechanism is enabled. In addition, a UE category may be created that defines the UE capabilities to be configured with the enhanced offloading mechanism and allows the network to configure the UE and the node B in the enhanced offloading mode. Furthermore, the RNC may configure the node B to report one or more downlink quantities to the RNC.

An embodiment allows offloading based on the radio link conditions in the current serving cell and candidate serving cell. In an embodiment, offloading is UE-specific and not cell-specific.

Some UEs, such as multiflow UEs or single frequency dual cell (SF-DC) high speed downlink packet access (HS-DPA) UEs, are capable of receiving simultaneous transmissions of independent downlink data streams from more than one node B and are capable of transmitting CQIs corresponding to the downlink transmissions to more than one node B. When such a UE is measuring the CQIs from at least two cells, the network can configure the UE such that the UE sends a subset of the sequences in the hybrid automatic repeat-request-acknowledgment (HARQ-ACK) field of the HS-DPCCH. Alternatively or additionally, when such a UE is measuring the CQIs from at least two cells, the network can configure the UE such that the UE adjusts the transmit power of the HARQ-ACK field of the HS-DPCCH.

The slot format of HS-DPCCH carrying $CQI_{candidate}$ is now considered. HS-DPCCH includes two independent fields: the HARQ-ACK field and the CQI field. In the legacy dual cell (DC) or SF-DC slot format, the UE is able to report two CQIs and two HARQ-ACK feedbacks on the same HS-DPCCH, as illustrated in Table 2.

TABLE 2

HS-DPCCH slot format for DC HS-DPCCH subframe

| Slot 0 | Slot 1 | Slot 2 |
|---|---|---|
| HARQ0 & HARQ1 | CQI0 & CQI1 | |

HARQx corresponds to the HARQ-ACK feedback for Cell x, while CQIx corresponds to the CQI feedback for Cell x. In general, "0" represents the serving cell. In DC, "1" represents the secondary serving cell. In this embodiment, "1" represents the candidate cell as indicated by the RNC.

Each HARQ-ACK feedback may be an acknowledgement (ACK), a negative acknowledgement (NACK) or discontinuous transmission (DTX), which is transmitting neither an ACK nor a NACK. As a result, there are nine different combinations of HARQ0 & HARQ1, and each combination may be encoded by a certain sequence of bits, as shown in Table 3.

TABLE 3

Combinations of HARQ0 & HARQ1

| HARQ0 & HARQ1 | Bit sequence | Transmit on HARQ-ACK |
|---|---|---|
| A&A | SEQ1 | |
| A&D | SEQ2 | Y |
| A&N | SEQ3 | |
| D&A | SEQ4 | |
| D&D | SEQ5 | Y |
| D&N | SEQ6 | |
| N&A | SEQ7 | |
| N&D | SEQ8 | Y |
| N&N | SEQ9 | |

It may be noted that SEQ5 can be either a bit sequence or DTX, meaning 0 transmit power.

As the candidate cell is not transmitting any data to the UE, HARQ1 may always be DTX. There are only three actual combinations to be transmitted on the HARQ-ACK field, as shown in Table 3.

In this embodiment, the network configures the UE in a specific mode, e.g., enhanced offloading mode, and the UE is assumed to transmit only a subset of the sequences for the HARQ-ACK field, e.g., as shown in Table 3, with DTX for the other cell with "Y" in the right most column. The node B is aware of this configuration, and will detect only a subset of those sequences. With the reduced search space for sequence detection at the node B, the transmit power for the HARQ-ACK field at the UE can be reduced without degrading the detection performance. For example, when the UE expects the candidate cell to transmit HS-SCCH and/or high-speed physical downlink shared channel (HS-PDSCH), the transmit power for the HARQ-ACK field is x, and any of the sequences in Table 3 may be transmitted. When the UE does not expect the candidate cell to transmit HS-SCCH and/or HS-PDSCH, the transmit power for the HARQ-ACK field is y, with y<x, and only a subset of the sequences in Table 3 may be transmitted. Both x and y may be configured by the network via RRC signaling or PHY signaling. Alternatively, the delta value between x and y may be predetermined, and when the UE receives signaling to work in the enhanced offloading mode, the UE performs a power backoff with the amount of this predetermined delta value.

In another embodiment, when the UE is measuring the CQIs from at least two cells, the network sends an indication to the UE that only a single downlink data stream is transmitted, and consequently only one HS-SCCH is transmitted. Then the UE may not expect to receive HS-SCCH and/or HS-PDSCH from the candidate cell. In this embodiment, the UE may be a multiflow UE or an SF-DC UE.

An SF-DC UE may detect the HS-SCCH from the serving cell and the indicated candidate cell and so is able to receive data from either one of the two cells or from both cells simultaneously. In the enhanced offloading mechanism, however, the UE receives data from one of the cells and therefore only needs to receive HS-SCCH from one of the cells. RRC or PHY signaling may be introduced so that the UE detects the HS-SCCH from only one of the cells. For example, if only the serving cell is to send data to the UE, the signaling may indicate to the UE not to detect HS-SCCH from the candidate cell or to detect HS-SCCH only from the serving cell.

In order to allow the above embodiments, the UE may be configured to measure CQIs from at least two cells, to feed back a subset of HARQ-ACK sequences, to adjust its transmit power on the HARQ-ACK field, and/or to detect only one HS-SCCH from one of the two cells.

In an embodiment, a new UE category defines a UE with capabilities to perform at least one of the novel features of the above embodiments. That is, the UE may able to measure long term CQI for the serving cell and/or the candidate cell, the UE may be able to measure CQIs from at least two cells, the UE may be able to report a subset of HARQ-ACK sequences, the UE may be able to adjust the transmit power of the HARQ-ACK field of the HS-DPCCH, and/or the UE may be able to detect only one HS-SCCH from one of the cells when the UE is in a multiflow mode, e.g., the SF-DC mode.

Figure 3:
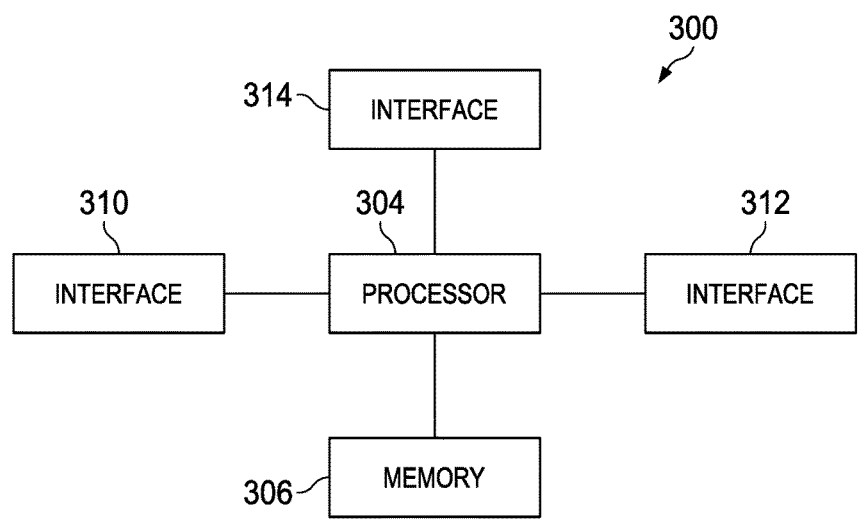
FIG. 3 illustrates a block diagram of an embodiment processing system for performing methods described herein.

FIG. 3 illustrates a block diagram of an embodiment processing system 300 for performing methods described herein, which may be installed in a host device. As shown, the processing system 300 includes a processor 304, a memory 306, and interfaces 310-314, which may (or may not) be arranged as shown the figure. The processor 304 may be any component or collection of components adapted to perform computations and/or other processing related tasks, and the memory 306 may be any component or collection of components adapted to store programming and/or instructions for execution by the processor 304. In an embodiment, the memory 306 includes a non-transitory computer readable medium. The interfaces 310, 312, 314 may be any component or collection of components that allow the processing system 300 to communicate with other devices/components and/or a user. For example, one or more of the interfaces 310, 312, 314 may be adapted to communicate data, control, or management messages from the processor 304 to applications installed on the host device and/or a remote device. As another example, one or more of the interfaces 310, 312, 314 may be adapted to allow a user or user device (e.g., personal computer (PC), etc.) to interact/communicate with the processing system 300. The processing system 300 may include additional components not depicted in the figure, such as long term storage (e.g., non-volatile memory, etc.).

In some embodiments, the processing system 300 is included in a network device that is accessing, or part otherwise of, a telecommunications network. In one example, the processing system 300 is in a network-side device in a wireless or wireline telecommunications network, such as a base station, a relay station, a scheduler, a controller, a gateway, a router, an applications server, or any other device in the telecommunications network. In other embodiments, the processing system 300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 4:
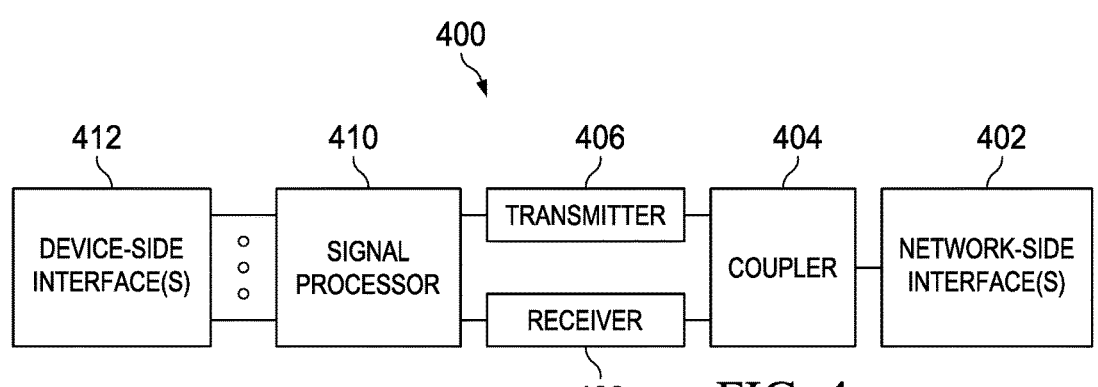
FIG. 4 illustrates a block diagram of a transceiver adapted to transmit and receive signaling over a telecommunications network.

In some embodiments, one or more of the interfaces 310, 312, 314 connects the processing system 300 to a transceiver adapted to transmit and receive signaling over the telecommunications network. FIG. 4 illustrates a block diagram of a transceiver 400 adapted to transmit and receive signaling over a telecommunications network. The transceiver 400 may be installed in a host device. As shown, the transceiver 400 comprises a network-side interface 402, a coupler 404, a transmitter 406, a receiver 408, a signal processor 410, and a device-side interface 412. The network-side interface 402 may include any component or collection of components adapted to transmit or receive signaling over a wireless or wireline telecommunications network. The coupler 404 may include any component or collection of components adapted to facilitate bi-directional communication over the network-side interface 402. The transmitter 406 may include any component or collection of components (e.g., up-converter, power amplifier, etc.) adapted to convert a baseband signal into a modulated carrier signal suitable for transmission over the network-side interface 402. The receiver 408 may include any component or collection of components (e.g., down-converter, low noise amplifier, etc.) adapted to convert a carrier signal received over the network-side interface 402 into a baseband signal. The signal processor 410 may include any component or collection of components adapted to convert a baseband signal into a data signal suitable for communication over the device-side interface(s) 412, or vice-versa. The device-side interface(s) 412 may include any component or collection of components adapted to communicate data-signals between the signal processor 410 and components within the host device (e.g., the processing system 300, local area network (LAN) ports, etc.).

The transceiver 400 may transmit and receive signaling over any type of communications medium. In some embodiments, the transceiver 400 transmits and receives signaling over a wireless medium. For example, the transceiver 400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 402 comprises one or more antenna/radiating elements. For example, the network-side interface 402 may include a single antenna, multiple separate antennas, or a multi-antenna array configured for multi-layer communication, e.g., single input single output (SIMO), multiple input single output (MISO), multiple input multiple output (MIMO), etc. In other embodiments, the transceiver 400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a configuring unit/module. The respective units/modules may be hardware, software, or a combination thereof. For instance, one or more of the units/modules may be an integrated circuit, such as field programmable gate arrays (FPGAs) or application-specific integrated circuits (ASICs).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for offloading a user equipment (UE) from a first node B to a second node B, the method comprising:
transmitting, by the first node B, a dedicated measurement report over an IuB interface between the first node B and a radio network controller (RNC), the dedicated measurement report being a downlink (DL) transport block size dedicated measurement type that is reported in an on-demand or periodic fashion, the dedicated measurement report indicating a channel quality indicator (CQI) value received from the UE, the CQI value for a channel between the UE and the first node B, the dedicated measurement report including an identifier of the channel between the UE and the first node B.

2. The method of claim 1, wherein the first node B transmits the dedicated measurement report in accordance with a message received from the RNC, the message including an instruction to send the dedicated measurement report at a time the message is received or an instruction to send the dedicated measurement report periodically.

3. The method of claim 1, wherein the first node B is configured to report at least one downlink quantity during setup of a link between the first node B and the RNC.

4. The method of claim 1, wherein the dedicated measurement report further includes an indication notifying the RNC of a serving cell or a candidate cell for offloading the UE.

5. The method of claim 1, wherein the first node B is configured to receive downlink quantities associated with more than one cell.

6. A first node B configured to offload a user equipment (UE) from the first node B to a second node B, the first node B comprising:
a non-transitory memory storage comprising instructions; and
one or more processors in communication with the memory, wherein the one or more processors execute the instructions for transmitting a dedicated measurement report over an IuB interface between the first node B and a radio network controller (RNC), the dedicated measurement report being a downlink (DL) transport block size dedicated measurement type that is reported in an on-demand or periodic fashion, the dedicated measurement report indicating a channel quality indicator (CQI) value received from the UE, the CQI value for a channel between the UE and the first node B, the dedicated measurement report further including an identifier of the channel between the UE and the first node B.

7. The first node B of claim 6, wherein the first node B transmits the dedicated measurement report in accordance with a message received from the RNC, the message including an instruction to send the dedicated measurement report at a time the message is received or an instruction to send the dedicated measurement report periodically.

8. The first node B of claim 6, wherein the first node B is configured to report at least one downlink quantity during setup of a link between the first node B and the RNC.

9. The first node B of claim 6, wherein the dedicated measurement report further includes an indication notifying the RNC of a serving cell or a candidate cell for offloading the UE.

10. The first node B of claim 6, wherein the first node B is configured to receive downlink quantities associated with more than one cell.

11. A method for offloading a user equipment (UE) from a first node B to a second node B, the method comprising:
receiving, by a radio network controller (RNC), a dedicated measurement report over an IuB interface between the RNC and the first node B, the dedicated measurement report being a downlink (DL) transport block size dedicated measurement type that is reported in an on-demand or periodic fashion, the dedicated measurement report indicating a channel quality indicator (CQI) value received from the UE, the CQI value for a channel between the UE and the first node B, the dedicated measurement report including an identifier of the channel between the UE and the first node B.

12. The method of claim 11, further comprising transmitting, by the RNC to the first node B, a message including at least one of:
an instruction to send the dedicated measurement report at a time the message is received; or
an instruction to send the dedicated measurement report periodically.

13. The method of claim 11, wherein the RNC receives at least one downlink quantity from the first node B during setup of a link between the first node B and the RNC.

14. The method of claim 11, wherein the RNC further configures the first node B to include in the dedicated measurement report an indication notifying the RNC of a serving cell or a candidate cell for offloading the UE.

15. The method of claim 11, wherein the RNC receives from the first node B downlink quantities associated with more than one cell.

16. A radio network controller (RNC) comprising:
a non-transitory memory storage comprising instructions; and
one or more processors in communication with the memory, wherein the one or more processors execute the instructions to receive a dedicated measurement report over an IuB interface between the RNC and a first node B, the dedicated measurement report being a downlink (DL) transport block size dedicated measurement type that is reported in an on-demand or periodic fashion, the dedicated measurement report indicating a channel quality indicator (CQI) value received from a user equipment (UE), the CQI value for a channel between the UE and the first node B, the dedicated measurement report including an identifier of the channel between the UE and the first node B.

17. The RNC of claim 16, wherein the RNC receives at least one downlink quantity from the first node B during setup of a link between the first node B and the RNC.

18. The RNC of claim 16, wherein the dedicated measurement report includes an indication notifying the RNC of a serving cell or a candidate cell for offloading the UE.

19. The RNC of claim 16, wherein the RNC receives from the first node B downlink quantities associated with more than one cell.

20. The RNC of claim 16, wherein the RNC is separate and distinct from a second node B, the UE being offloaded from the first node B to the second node B.

21. The method of claim 1, wherein the RNC is separate and distinct from the second node B, the UE being offloaded from the first node B to the second node B.

22. The first node B of claim 6, wherein the RNC is separate and distinct from the second node B, the UE being offloaded from the first node B to the second node B.

23. The method of claim 11, wherein the RNC is separate and distinct from the second node B, the UE being offloaded from the first node B to the second node B.

* * * * *